United States Patent Office 3,037,997
Patented June 5, 1962

3,037,997
LEAD SALTS OF SUBSTITUTED
PROPIONIC ACID
John J. Hewitt, Cheshire, Conn., assignor to Olin Mathieson Chemical Corporation, New Haven, Conn., a corporation of Virginia
No Drawing. Filed Oct. 12, 1956, Ser. No. 615,503
7 Claims. (Cl. 260—435)

This invention relates to novel lead salts of dialkyl amino propionic acid.

The new lead salts have a composition in accordance with the general structural formula

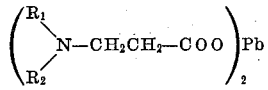

wherein $R_1$ and $R_2$ are the same or different alkyl groups containing a total of 12 to 24 carbon atoms. Thus, when $R_1$ is a lower alkyl group such as methyl, ethyl, propyl, isopropyl, butyl, isobutyl, amyl or isoamyl, $R_2$ is a longer alkyl group such as undecyl, decyl, nonyl, or octyl so that the total number of carbon atoms in $R_1$ and $R_2$ is 12 to 24. Preferably, $R_1$ and $R_2$ are the same alkyl group having a branched structure such as in the lead salt of N,N-di-2-ethylhexyl-beta-aminopropionic acid.

The novel lead salts of this invention may be prepared conveniently by initially adding a secondary amine

where $R_1$ and $R_2$ are alkyl groups as defined above, to methyl acrylate to produce the methyl ester of the dialkyl amino-propionic acid. The methyl ester may then be saponified to form the sodium salt, from which the lead salt may be prepared conveniently by double decomposition. Such syntheses are illustrated in the following specific examples.

*Example 1*

Methyl acrylate (1.2 moles) was added slowly to di-2-ethylhexyl amine (1 mole) containing 10 ml. of glacial acetic acid, as catalyst, the temperature being gradually raised from 20° C. to 40° C. After the addition was completed, the temperature was raised to 60° C. and the mixture was stirred for four (4) hours. Excess methyl acrylate was then removed by distillation under reduced pressure. The residual reaction mixture was then subjected to distillation and a yield of methyl N,N-di-ethyl-hexyl-beta-aminopropionate amounting to 70% of the theoretical yield was obtained as the fraction boiling at 128° C. at a pressure of 0.2 mm. of mercury.

Index of refraction: $N_D^{24}$ 1.4481.

Analysis.—4.0% N (theoretical 4.2%).

*Example 2*

The methyl ester, prepared as in Example 1 (0.61 mole), was saponified by refluxing for an hour with an equivalent amount of sodium hydroxide dissolved in 600 ml. of aqueous methanol (85% by weight $CH_3OH$). The solution was then evaporated to dryness to deposit the sodium salt.

The sodium salt was dissolved in 700 ml. of aqueous methanol (50% by weight $CH_3OH$) at about 50° C. and a solution of lead nitrate (0.31 mole) in 700 ml. distilled water was added slowly with thorough agitation of the solution. The lead salt precipitated as an oily salt. The water layer was decanted and the salt was triturated with added water which was then decanted. The lead salt was then dissolved in 400 ml. of benzene and the solution was subjected to distillation until the distillate was clear, that is, substantially all the water had been vaporized from the solution. The residual solution was then filtered and freed of solvent by vaporization under vacuum. The residue was the pure lead salt in the form of a crystal clear melt which, on cooling, solidified to a glassy state, the yield amounting to 95% of the theoretical. The salt when analyzed was found to contain somewhat less than the theoretical content of lead (23.6%), at least in part due to residual solvent content.

Procedures similar to the above are likewise adapted for the preparation of the intermediates and other lead salts in accordance with this invention.

The intermediate dialkyl aminopropionic acids may also be synthesized by condensing the appropriate dialkylamine with acrylonitrile to form an adduct which when hydrolyzed in the presence of caustic soda, yields the corresponding sodium salt. The latter yields the lead salt on double decomposition with a soluble lead salt as described above.

These lead salts are characterized by ready solubility in mineral oils, benzene, ethyl acetate, methyl ethyl ketone, mixtures of the above, and other organic solvents. The favorable solubility properties are obtained in the lead salts containing $R_1$ and $R_2$ alkyl groups as specified above, similar lead salts containing less carbon, for example, being less soluble in organic solvents. While the above procedure is specifically directed to the preparation of normal lead salts, it will be understood that basic lead salts are also advantageous and may be prepared by carrying out the double decomposition reaction in the presence of alkali or other alkaline reagent.

The properties of these novel lead salts are such as to make them advantageous for many industrial applications. They serve as excellent thickeners for lubricants, for which purpose an amount of about 5 to 10% by weight is readily dissolved by mixing with a lubricating mineral oil, for example of grade S.A.E. 20, and heating to a temperature of about 100° to 150° C. with stirring. A clear solution results which on cooling, remains clear and has substantially higher viscosity than the original oil.

The novel lead salts likewise display effective properties as soluble driers in varnishes and other coating compositions based on unsaturated constituents.

The lead salts of this invention are outstandingly useful as ballistic modifiers in nitrocellulose-based propellant compositions wherein a few percent of the novel salt or mixture of such salts exerts a powerful effect in controlling the rate of combustion, to such an extent as to obtain a substantially constant burning rate over a range of pressures, which rate is also substantially unaffected or but slightly affected by a change in temperature over a fairly wide range of temperatures, as more fully described in the copending application Serial No. 615,501 of Herman A. Bruson and Robert A. Cooley, filed of even date herewith.

For example, it was found that a propellant having a composition in percent by weight about as follows: 57.8% nitrocellulose, 24.7% nitroglycerine, 9.2% triacetin, 3.3% dioctylphthalate, 1.7% 2-nitrodiphenylamine and 3.3% of a lead salt or mixture of lead salts in accordance with this invention displays a substantially constant burning rate of 0.33 to 0.39 when burned under a pressure of 1,000 to 2,000 pounds per square inch at an initialt temperature of 70° to 140° F.

The above burning rate is greater than that for the base composition free of the lead salt and is substantially independent of pressure and temperature over the indicated ranges.

I claim:
1. An oil soluble lead salt of a dialkylaminopropionic acid, wherein the alkyl substituents together contain 12 to 24 carbon atoms.

2. An oil soluble lead salt having the composition corresponding to the formula

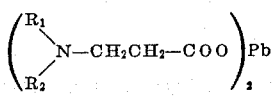

wherein $R_1$ and $R_2$ are alkyl groups together containing a total of 12 to 24 carbon atoms.

3. An oil soluble lead salt in accordance with claim 2, wherein $R_1$ and $R_2$ are the same alkyl group.

4. An oil soluble lead salt in accordance with claim 2 wherein $R_1$ and $R_2$ are branched alkyl groups.

5. An oil soluble lead salt of N,N-di-2-ethylhexyl-beta-aminopropionate.

6. A lubricant having a mineral oil base and having as the principal viscosity increasing additive from about 5 to 10% by weight of a compound selected from the group consisting of:

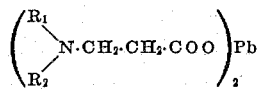

wherein $R_1$ and $R_2$ are alkyl groups containing a total of 12 to 24 carbon atoms.

7. The method of thickening lubricants having a mineral oil base which comprises dissolving in said lubricant a compound selected from the group consisting of:

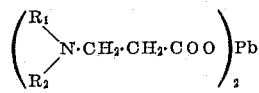

wherein $R_1$ and $R_2$ are alkyl groups containing a total of 12 to 24 atoms, to the extent of about 5 to 10% by weight of said lubricant, said dissolution being carried out by heating the lubricant and compound to a temperature of about 100 to 150° C. with stirring.

References Cited in the file of this patent

UNITED STATES PATENTS

| | | |
|---|---|---|
| 2,044,968 | Bruson | June 23, 1936 |
| 2,203,099 | Calcott et al. | June 4, 1940 |
| 2,629,694 | Woods et al. | Feb. 24, 1953 |
| 2,684,954 | Miller | July 27, 1954 |

FOREIGN PATENTS

| | | |
|---|---|---|
| 558,682 | Great Britain | Jan. 17, 1944 |

OTHER REFERENCES

Chemical Abstracts, vol. 47 (1953), page 4843C.